Aug. 7, 1945.  H. BARR  2,381,100
AUTOMATIC FISHLOCK
Filed Nov. 2, 1944  4 Sheets-Sheet 3
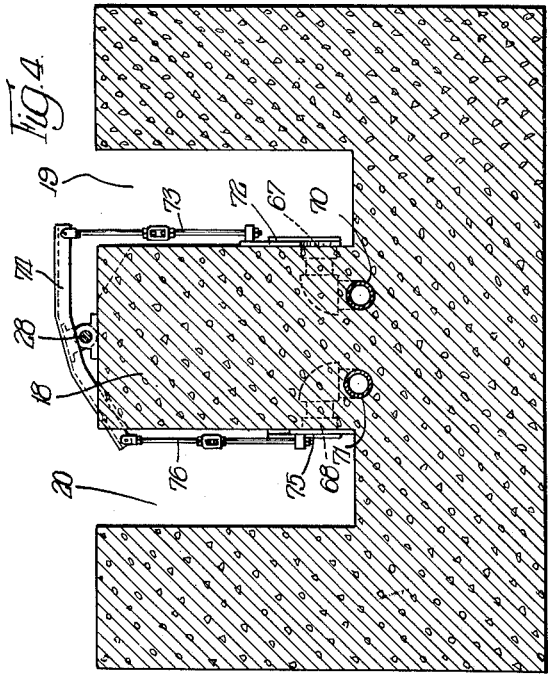
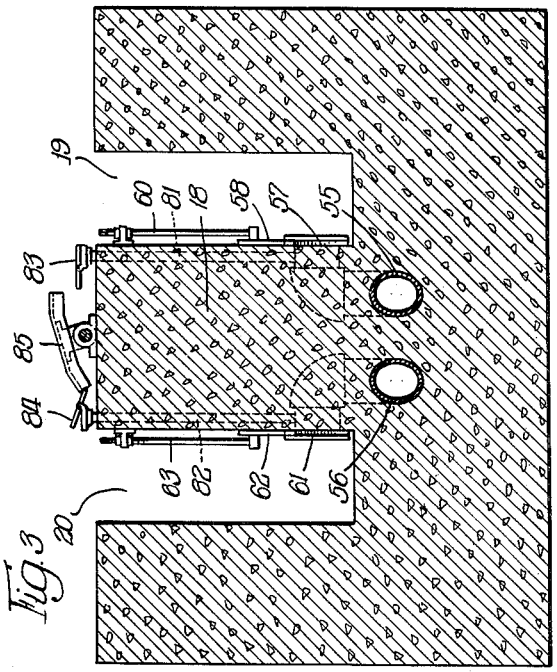
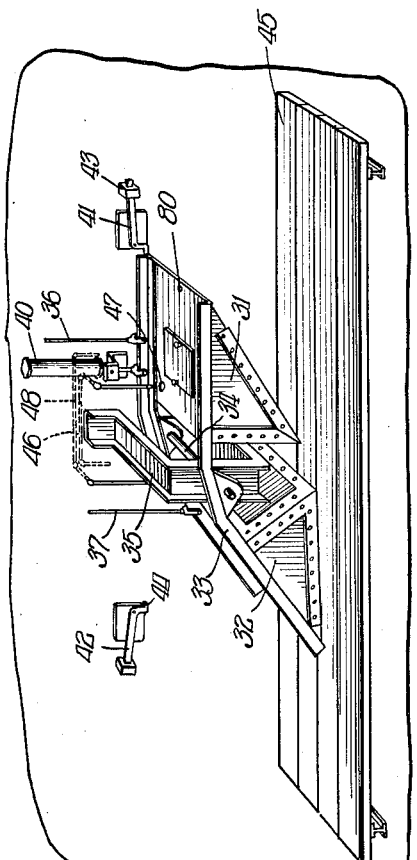
INVENTOR.
Harry Barr,
BY

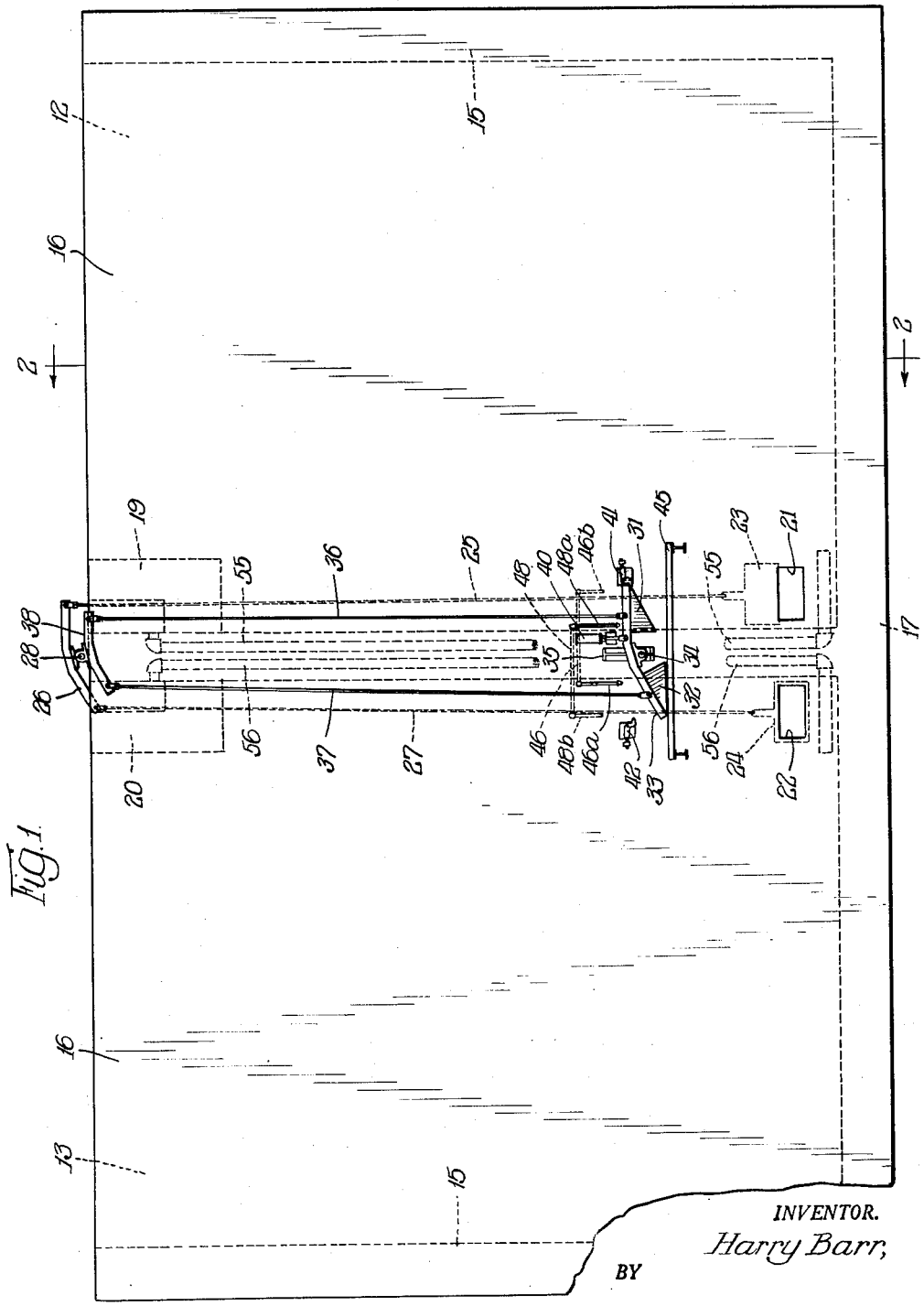

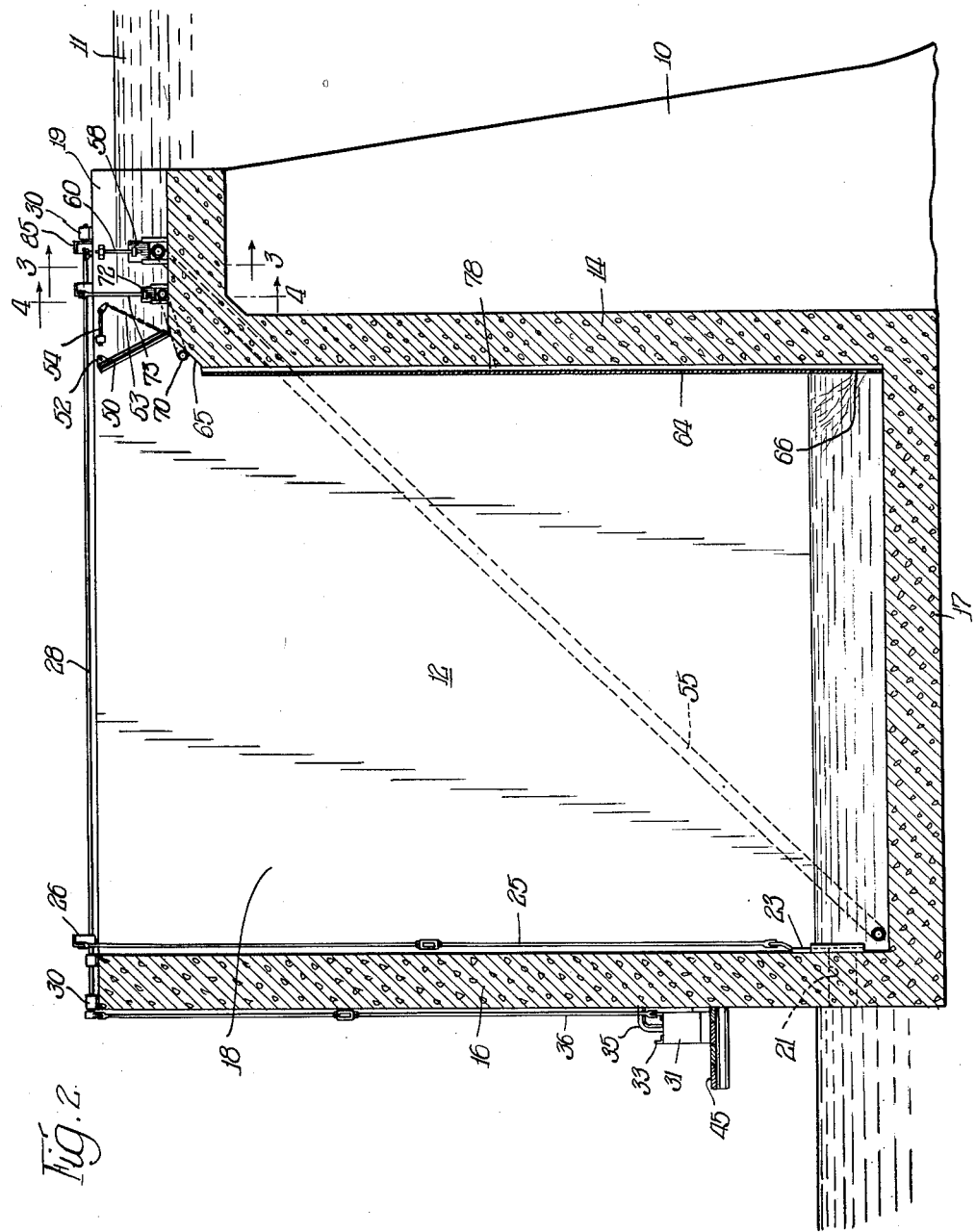

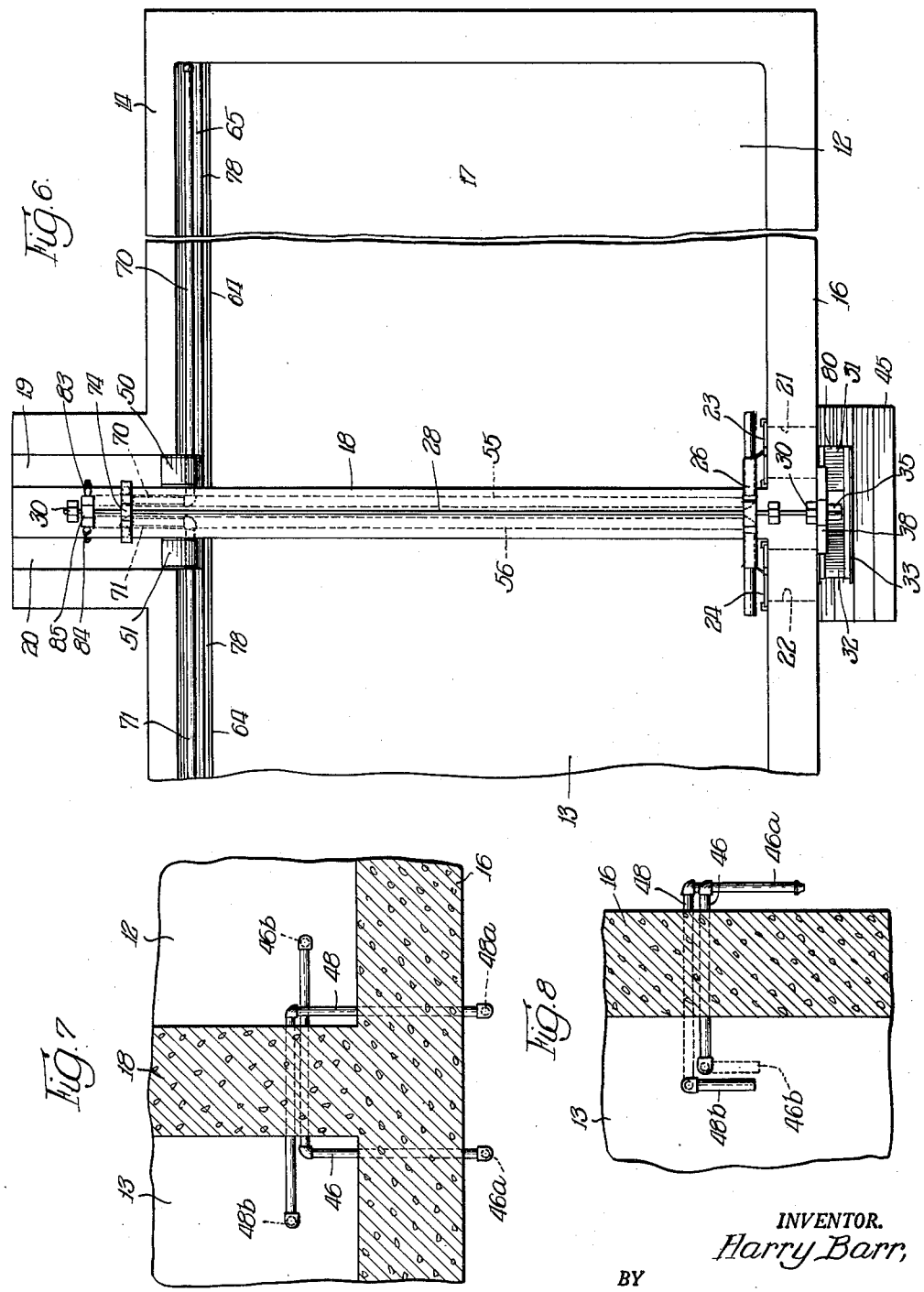

Patented Aug. 7, 1945

2,381,100

UNITED STATES PATENT OFFICE 2,381,100

AUTOMATIC FISH LOCK

Harry Barr, Ironwood, Mich.

Application November 2, 1944, Serial No. 561,518

15 Claims. (Cl. 61—21)

The invention relates to improvements in fishlocks for enabling fish to work their way up stream past obstructions such as dams or falls and to also provide for travel of the fish down stream without injury to the fish.

In recent years the building of dams in rivers and streams has been encouraged as a water conservation measure and to also prevent excessive soil erosion by a too rapid drainage of the rainfall from the area. However, any obstruction in rivers and streams interferes with the migration of fish at spawning time and has a most detrimental effect upon natural reproduction. In my Patent No. 1,872,556, granted August 16, 1932, I disclose and claim an automatic fishlock which operates on the principle of attracting the fish to the lock by the action of the water, which requires that the fish swim against the current. This is in accordance with the natural habits of the fish and thus they are first attracted to the entrance of the lock by the rush of water resulting from the emptying operation and then subsequently in the operation of the lock the fish are caused to swim out to the waters above the dam by the opening action of the gates.

An object of the present invention is to provide an improved fishlock which will utilize to a greater extent the natural habits of the fish to swim upstream and against the flow of water when spawning.

Another object is to provide a fishlock operating automatically and using the natural flow of the water of the stream to cause periodic actuation of alternately operating gates whereby twin fishlocks are filled with water and emptied in an alternate manner.

Another object resides in the provision of twin fishlock structure having entrances and exits for the fish in side by side relation and wherein the fishlocks are alternately open to the waters below the dam and are continuously attracting the fish by discharge of water therefrom.

Another object of the invention is to provide twin fishlock structure as described with means for delivering to each fishlock a constant supply of water from above the dam or other obstruction and which is discharged in the bottom of the fishlock in a manner to cause a swirling action of the water within the lock.

Another object of the invention is to provide a fishlock of the character described which will automatically effect alternate opening and closing of the gates in the bottom of the locks, the action also being utilized to automatically control the discharge of water from above the dam to within the bottom of the fishlocks and adjacent the rear wall thereof, thus providing an additional attraction for the fish to assist in retaining them within the lock until the gate is closed.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a front elevational view of the twin fishlock structure comprising the present invention;

Figure 2 is a vertical sectional view taken substantially along line 2—2 of Figure 1;

Figure 3 is a detail sectional view taken substantially along line 3—3 of Figure 2;

Figure 4 is a detail sectional view taken substantially along line 4—4 of Figure 2;

Figure 5 is a front perspective view showing the oscillating containers for causing opening and closing of the gates;

Figure 6 is a top plan view showing the twin fishlock structure with the dividing partition and sluiceways on the respective sides of the same; and Figures 7 and 8 are sectional views showing the construction of one of the conduits for delivering water from a fishlock to one of the containers.

The apparatus of the invention may be directly associated with a dam 10 or similar obstruction in a river or stream for impounding a body of water such as 11. Located on the down stream side of the dam the apparatus includes an enclosure, preferably formed of concrete, providing two fishlocks or wells 12 and 13. Each fishlock comprises a rear wall 14, side walls 15, a front wall 16 and a bottom 17. The partition 18 is located centrally of the structure and this partition in effect divides the same into the fishlocks 12 and 13, as described. Each fishlock is provided with a sluiceway 19 and 20, respectively, leading to the waters above the dam and which are located on the respective sides of the center partition wall 18. The front wall 16 of each fishlock is provided with an opening 21 and 22, respectively, leading to the waters below the dam and through which the fish enter in working their way up stream with the help of the present apparatus. Preferably the structure providing the fishlocks is located in relation to the dam so that the bottom wall 17 is at least several feet below the low water mark of the stream below the dam and also several feet above the high water mark at the top of the dam.

It is to be understood that the device, although shown associated with a dam, can with equal efficiency be applied so as to allow fish to work their way up stream past natural obstructions such as a water fall.

The openings 21 and 22 in the fishlocks 12 and 13, respectively, are alternately closed and opened by means of vertically operating gates 23 and 24. Gate 23 within fishlock 12 is suitably connected to the rod 25, which in turn has connection at its upper end with the cross arm 26. The gate 24 in fishlock 13 is connected to rod 27 which likewise connects at its upper end with the cross arm 26. A countershaft 28 is located on the partition wall 18, the same extending longitudinally of the wall and being journalled for rotation at its respective ends by the bearings 30. The cross arm 26 is suitably secured to said countershaft and upon oscillation of the countershaft the cross arm is rocked to cause the gates to alternately close and open. For actuating said gates 23 and 24 the invention provides oscillating containers 31 and 32 carried by supporting structure 33 and which structure supports the containers on shaft 34 in a manner permitting oscillation of the containers. The metal bracket 35 is suitably secured to the front wall 16 of the fishlock structure and projects forwardly therefrom to provide a journalling bracket for the front end of shaft 34. Rods 36 and 37 connect with the supporting structure on the respective sides of shaft 34 and extend upwardly for connection with the cross arm 38 fixed to the extending end of shaft 28. A dashpot 40 is suitably supported on the front wall 16 and operatively connected to the supporting structure 33 to one side of the pivot shaft 34, as clearly shown in Figure 5. For locking the containers in elevated position the invention provides latch means 41 and 42 each comprising a pivoted arm having a weight 43 at one end and latching structure 44 at its opposite end. Container 31 is shown in latched position. Water is admitted to the container in a manner and under conditions as will be presently described and when the weight of said container over-balances the latching means 41 the latch is automatically released, permitting said container to descend to a discharging position on platform 45, which results in elevating container 32, causing the same to be latched in raised position by its latching means 42.

The fishlock 12 functions to deliver water to container 32, whereas, fishlock 13 functions to deliver water to container 31. As shown in Figure 5, delivery conduit 46 extends through the front wall 16 and through the partition wall 18, having a depending portion at both ends. The depending portion 46a, located outside of the fishlock, is in alignment with the filling opening 47 in container 32. The depending end 46b of said delivery conduit, which is located within fishlock 12, is provided so that said end will be under the water as it rises within the fishlock before actual discharge of said water takes place, thus preventing debris and the like on the surface of the water from clogging the small opening of said conduit. Conduit 48 extends from fishlock 13 to outside the front wall of the structure and has a depending portion 48a in alignment with the filling opening 47 in container 31. Said delivery conduit operates in a manner as above described and the depending end 48b in fishlock 13 likewise prevents clogging of the small opening.

Each of the sluiceways 19 and 20 is provided with an automatic gate 50 and 51, respectively, each gate being pivotally secured in place as at 52 and connecting by means of chain 53 with counterbalancing means 54. The weight of each gate is sufficient to overbalance the means 54 so that the gates normally have a tendency to descend into a closed position, closing off its respective fishlock from the waters above the dam. However, when the fishlock fills with water the pressure on the pivoted gate is substantially equalized, at least to the extent where the counterbalancing means 54 will cause the gate to open. This automatic opening action of the gates serves to permit fish to swim from the locks through the sluiceways to the waters above the dam. The reverse is also true when the fish are working their way down stream, that is, they are then able to swim through the sluiceways into the fishlocks when the gates are open.

During operation a continuous discharge of water takes place in the bottom of each fishlock, the same being discharged from the conduits 55 and 56 for the fishlocks 12 and 13, respectively. It will be noted that each conduit extends through the partition wall 18 in a forwardly and downwardly direction and projects into its fishlock so as to discharge water in a circular manner. Actually the discharge from both conduits 55 and 56 is such as to cause a swirling action of the water within the bottom of the fishlock. With the vertically operating gate of the fishlock open, the fish enter said lock and are caused to remain in the same as a result of this swirling motion given to the water from its respective conduit 55 or 56. Conduit 55 has an inlet 57 in sluiceway 19, the same being closed by gate 58 actuated into an open or a closed position by means of the manually rotated rod 60. Conduit 56 has an inlet 61 closed by the gate 62 and which gate is operated by rod 63.

During the time the vertically operating gate of a fishlock is open and fish are caused to enter the opening to the fishlock, apparatus of the invention operates in a manner to retain said fish within the lock and until the vertically operating gate closes. The same includes a secondary wall 64 which preferably comprises a metal plate spaced a distance from the rear wall of its respective lock. The plate extends from the bottom 17 to the sloping portion 65 of said rear wall and openings 66 are located near the base of said metal plate. Each sluiceway has a secondary inlet, namely, 67, for sluiceway 19, and 68 for sluiceway 20. Conduit 70 connects with inlet 67 and extends downwardly in the partition wall 18 for a short distance and then projects laterally so that it is located over the metal plate 64 of fishlock 12. The structure of fishlock 13 is similar. Conduit 71 connects with inlet 68 and extends downwardly in partition wall 18 and then projects laterally in fishlock 13 directly over the metal plate 64 in said lock. Inlet 67 is closed by gate 72, having connection with rod 73, which in turn connects with the right hand end of cross arm 74, Figure 4. Said cross arm is fixed to the countershaft 28. Inlet 68 is closed by gate 75, having connection with rod 76, and which in turn connects with the left hand end of cross arm 74. As said cross arm oscillates, due to the oscillating action of the containers, the gates 72 and 75 are alternately raised and lowered to open and close the inlets 67 and 68. Inlet 67 allows water to enter conduit 70, which water is discharged into the narrow passageway 78 between wall 14 and plate 64 in fishlock 12. Inlet 67 is open so that this discharge of water takes place during the time the fish are being attracted to fishlock 12 and are being caused to enter its front opening 21. The water descends through the narrow passageway 78 and is discharged through openings 66 with a slight pressure and sufficient turbulence to act as an attraction for the fish, thus inducing them to stay within the lock which they have entered. When inlet 67 is open it will be observed from Figure 4 that inlet 68 is closed. No water is being discharged from conduit 71 since fishlock 13 has its gate 24 in closed position and the fishlock is thus filling up with water. Under these conditions there is no reason for discharging water from conduit 71 and the inlet 68 to said conduit is automatically maintained closed by the oscillating action of cross arm 74.

In the operation of the twin fishlock structure a continuous flow of water is supplied to the bottom of each fishlock through conduits 55 and 56, respectively. As stated, the discharge from each conduit is such as to cause a circular swirling action of the water within the bottom of the fishlock. More specifically, the discharge end of each conduit is located below the opening in the front wall of its fishlock and the same extends across the opening. Assuming that vertically operating gate 24 in fishlock 13 is closed, it will be understood that the water within said fishlock slowly rises and eventually reaches the level of delivery conduit 48 so that a small stream of water is discharged exteriorly of the structure through the depending end 48a of said delivery conduit to container 31. As the water in fishlock 13 continues to rise container 31 gradually fills. Subsequently the water in the fishlock will effect opening of gate 51 joining the water in the fishlock with the waters above the dam. Any fish that may have been elevated will thereupon find their way through the sluiceway 20 to said upper waters. After a predetermined period of time, following opening of gate 51, the container 31 will become filled with water to effect an oscillating movement of the container structure, with the result that container 31 is lowered and container 32 elevated. The water from container 31, when in lowered position, is discharged through outlet 80. Oscillation of the containers will actuate the countershaft 28 and through cross arm 26 will elevate gate 24 and close gate 23. The fishlock 13 now discharges through opening 22, whereas, fishlock 12 begins to fill. The filling action is the same as previously described with the water eventually reaching the level of delivery conduit 46 and being discharged into container 32. Subsequently the level of the water reaches the pivoted gate 50 to substantially equalize the pressure on the respective sides of said gate, whereupon the gate opens through the action of the counterbalancing means 54. Any fish elevated by the rise of water in fishlock 12 are thus permitted to exit through sluiceway 19 to the upper waters.

The continuous discharge of water into the fishlocks 12 and 13 from sluiceways 19 and 20 through conduits 55 and 56 is facilitated by the air vents 81 and 82. Air vent 81 has connection with conduit 55 and extends vertically through partition wall 18 to project beyond the same, its upper end being fitted with a normally closed cap 83. Air vent 82 connects with conduit 56 and likewise extends upwardly to project beyond partition wall 18 where its upper end is equipped with a normally closed cap 84. The cross arm 85, actuated by countershaft 28, has operation to normally contact the caps 83 and 84, causing them to open, and to hold them open until they are permitted to close. When the fishlocks are filled with water a suction tends to develop within the conduit 55 or 56 since it will be understood that both ends are under water at all times and the water through the conduit is at all times descending. To facilitate full discharge of water from each conduit at all times, whether its respective fishlock is being filled or not, the air venting tubes 81 and 82 are alternately opened to break any suction which may develop during the period of filling its respective fishlock. For example, when fishlock 13 is filled with the water discharged from conduit 56 the air vent 82 is open since cross arm 85 will have been moved into a position to effect opening of cap 84. This air venting of the conduits is also desirable since air is taken into the conduit along with the water and this is expelled from the bottom of each fishlock. The fish are therefore assured of an adequate supply of air in the water during the filling operation of the fishlocks. The air vents have utility as above described even though the normally closed caps may be omitted since the air vents could be open at all times.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. The combination with dam structure or the like, of twin fishlocks each having an opening leading to the water above the dam and a second opening communicating with the water below the dam, a conduit for each fishlock for continuously discharging water from above the dam to the bottom portion of its respective fishlock, and in a manner to cause a swirling action of the water within said bottom portion, means for alternately closing and opening the second openings to the fishlocks to cause said fishlocks to alternately fill with water and empty, and other means for delivering to each fishlock additional water from above the dam during the period when the second opening to the fishlock is open.

2. The combination with dam structure or the like, of twin fishlocks each having an opening in the rear wall thereof leading to the water above the dam and a second opening in the front wall thereof communicating with the water below the dam, a conduit for each fishlock for continuously discharging water from above the dam to the bottom portion of its respective fishlock and in a manner to cause a swirling action of the water within said bottom portion, means for alternately closing and opening said second openings to the fishlocks to cause said fishlocks to alternately fill with water and empty, and other means for delivering to each fishlock additional water from above the dam during the period when the second opening to the fishlock is open, said other means delivering said additional water to the bottom portion of its respective fishlock and adjacent the rear wall thereof.

3. The combination with dam structure or the like, of twin fishlocks each having an opening leading to the water above the dam and a second opening communicating with the water below the dam, a conduit for each fishlock for continuously discharging water from above the dam to the bottom portion of its respective fishlock, each conduit having a position in its fishlock to cause a swirling action of the water delivered thereby and having location below the second opening to the fishlock, means for alternately closing and opening said second openings to the fishlocks to cause said fishlocks to alternately fill with water and empty, other means for delivering to each fishlock additional water from above the dam during the period when the second opening to the fishlock is open, and an air vent for each conduit located adjacent the inlet end thereof.

4. The combination with dam structure or the like, of twin fishlocks each having an opening leading to the water above the dam and a second opening communicating with the water below the dam, a conduit for each fishlock for continuously discharging water from above the dam to the bottom portion of its respective fishlock, each conduit having a position in its fishlock to cause a swirling action of the water delivered thereby and having location below the second opening to the fishlock and adjacent said opening, means for alternately closing and opening said second openings to the fishlocks to cause said fishlocks to alternately fill with water and empty, other means for delivering to each fishlock additional water from above the dam during the period when the second opening to the fishlock is open, an air vent for each conduit located adjacent the inlet end thereof, means normally maintaining said air vents closed, and means for opening one air vent at a time in synchronism with the closing of the second opening.

5. The combination with dam structure or the like, of twin fishlocks each having an exit opening in its rear wall thereof leading to the water above the dam and an inlet opening in the front wall thereof communicating with the water below the dam, a conduit for each fishlock for continuously discharging water from above the dam to the bottom portion of its respective fishlock, each conduit having a position in its fishlock to cause a swirling action of the water delivered thereby, means for alternately closing and opening the inlet openings to said fishlocks to cause said fishlocks to alternately fill with water and empty, other means for delivering to each fishlock additional water from above the dam during the period when the inlet opening to the fishlock is open, and adjustable means, respectively, for regulating the quantity of water discharged by the conduits.

6. The combination with dam structure or the like, of twin fishlocks each having an exit opening in its rear wall thereof leading to the water above the dam and an inlet opening in the front wall thereof communicating with the water below the dam, a conduit for each fishlock for continuously discharging water from above the dam to the bottom portion of its respective fishlock, each conduit having a position in its fishlock to cause a swirling action of the water delivered thereby, means for alternately closing and opening the inlet openings to said fishlocks to cause said fishlocks to alternately fill with water and empty, other means for delivering to each fishlock additional water from above the dam during the period when the inlet opening to the fishlock is open, air vents for each conduit adjacent the inlet end thereof, and adjustable means, respectively, for regulating the quantity of water continuously discharged by the conduits.

7. The combination with dam structure or the like, of two fishlocks each including a vertical well, a sluiceway for each well leading to the water above the dam, a pivoted gate in each sluiceway for closing the same but opening when water from the well flows into the sluiceway, an opening provided in the lower portion of each well and leading to the water below the dam, a gate for closing each opening, actuating means for the gates to cause them to alternately close and open, a conduit for each well for delivering water thereto from above the dam, whereby each well is alternately filled with water and emptied, and a delivery pipe for each well for conducting water therefrom during the filling of the well for effecting operation of said actuating means.

8. The combination with dam structure or the like, of two fishlocks each including a vertical well, a sluiceway for each well leading to the water above the dam, a pivoted gate in each sluiceway for closing the same but opening when water from the well flows into the sluiceway, an opening provided in the lower portion of each well and leading to the water below the dam, a gate for closing each opening, actuating means for the gates to cause them to alternately close and open, a conduit for each well for delivering water thereto from above the dam, whereby each well is alternately filled with water and emptied, a delivery pipe for each well having location approximately centrally of the height thereof, each pipe delivering water from its well during the filling of the same for effecting operation of said actuating means.

9. The combination with dam structure or the like, of two fishlocks each including a vertical well having a common partition wall, a sluiceway for each well leading to the water above the dam, a pivoted gate in each sluiceway for closing the same but opening when water from the well flows into the sluiceway, an opening provided in the lower portion of each well spaced from the bottom thereof and leading to the water below the dam, a gate for closing each opening, actuating means for the gates to cause them to alternately close and open, and a conduit for each well for delivering water from above the dam to the base of each well and below the said opening in the lower portion thereof, whereby each well is alternately filled with water and emptied.

10. The combination with dam structure or the like, of two fishlocks each including a vertical well having a common partition wall, a sluiceway for each well leading to the water above the dam, a pivoted gate in each sluiceway for closing the same but opening when water from the well flows into the sluiceway, an opening provided in the lower portion of each well spaced from the bottom thereof and leading to the water below the dam, a gate for closing each opening, actuating means for the gates to cause them to alternately close and open, and a conduit for each well having location in the common partition wall, each conduit delivering water from above the dam to the lower portion of its respective well and below the opening in the lower portion thereof, whereby each well is alternately filled with water and emptied, and a delivery pipe for each well for conducting water therefrom during the filling of the well for effecting operation of said actuating means.

11. The combination with dam structure or the like, of two fishlocks each including a vertical well having front and rear walls and having a common partition wall, a sluiceway in the rear wall of each well leading to the water above the dam, a pivoted gate in each sluiceway for closing the same but opening when water from the well flows into the sluiceway, an inlet opening provided in the front wall of each well and leading to the water below the dam, a gate for closing each opening, actuating means for the gates to cause them to alternately close and open, a conduit for each well having location in the common partition wall for delivering water from above the dam to the lower portion of its respective well, whereby each well is alternately filled with water and emptied, a delivery pipe for each well for conducting water therefrom during the filling of the same for effecting operation of said actuating means, and other means for delivering to each fishlock additional water from above the dam during the period when the inlet opening to the fishlock is open.

12. The combination with dam structure or the like, of two fishlocks each including a vertical well having front and rear walls and having a common partition wall, a sluiceway in the rear wall of each well leading to the water above the dam, a pivoted gate in each sluiceway for closing the same but opening when water from the well flows into the sluiceway, an inlet opening provided in the front wall of each well and leading to the water below the dam, a gate for closing each opening, actuating means for the gates to cause them to alternately close and open including an oscillatable member supporting a container at its respective ends, a conduit for each well for delivering water thereto from above the dam, whereby each well is alternately filled with water and emptied, and a delivery pipe for each well for conducting water from its respective well during the filling of the same, said pipes delivering said water to the containers for effecting oscillation of said oscillatable member.

13. The combination with dam structure or the like, of twin fishlocks each having a front, rear and side wall and a common partition wall, a sluiceway in the rear wall of each fishlock leading to the water above the dam, a pivoted gate in each sluiceway for closing the same, an inlet opening in the front wall of each fishlock leading to the water below the dam, a vertically operating gate for each opening for closing the same, actuating means for the gates to cause them to alternately close and open, said actuating means comprising an oscillatable member supported from the front wall and having a container fixed to each end thereof, a conduit for each fishlock for continuously delivering water to its respective fishlock, an auxiliary conduit for each fishlock for conducting additional water from above the dam and delivering the same to adjacent the rear wall of its fishlock, and means receiving actuation from said oscillatable member and operating to alternately close said auxiliary conduits.

14. The combination with dam structure or the like, of twin fishlocks each including a vertical well, a passageway in the upper portion of each well leading to the water above the dam, a pivoted gate in each passageway for closing the same, an inlet opening provided in the lower portion of each well and leading to the water below the dam, a gate for each opening for closing the same, actuating means for said gates to cause them to alternately close and open comprising an oscillatable member having a container fixed to each end thereof, a conduit for each well for continuously delivering water to its respective well, whereby each well is alternately filled with water and emptied, and a delivery pipe for each well for conducting water from its well during the filling of the same and for delivering said water to the containers to cause oscillating movement of said oscillatable member.

15. The combination with dam structure or the like, of twin fishlocks each comprising a vertical well including front and rear walls, a passageway in the rear wall of each well leading to the water above the dam, a pivoted gate in each passageway for closing the same, an inlet opening provided in the front wall of each well and leading to the water below the dam, a gate for each opening for closing the same, actuating means for the gates to cause them to alternately close and open including an oscillatable member supported from the front wall and having a container fixed to each end thereof, a conduit for each well for continuously delivering water to its respective well, whereby each well is alternately filled with water and emptied, a delivery pipe for each well extending through the front wall thereof approximately centrally of the height of the well, said delivery pipes conducting water from their well during the filling of the same and delivering said water to the containers to cause oscillating movement of said oscillatable member, and said delivery pipes each having a downwardly directed inlet end within its well and a downwardly directed discharge end located exteriorly of the front wall of the twin fishlocks.

HARRY BARR.